United States Patent
Leutsch et al.

(10) Patent No.: US 6,381,799 B1
(45) Date of Patent: May 7, 2002

(54) WINDSHIELD WIPER WITH BLADE LIFTING MECHANISM

(75) Inventors: Wolfgang Leutsch, Buehlertal; Tino Boos, Baden-Baden; Wolfgang Ostrowski, Wolfsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,778

(22) PCT Filed: Nov. 8, 2000

(86) PCT No.: PCT/DE00/03909
  § 371 Date: Aug. 27, 2001
  § 102(e) Date: Aug. 27, 2001

(87) PCT Pub. No.: WO01/34441
  PCT Pub. Date: May 17, 2001

(30) Foreign Application Priority Data

Nov. 11, 1999 (DE) .......................................... 199 54 147

(51) Int. Cl.⁷ .................................................. B60S 1/06
(52) U.S. Cl. ................................ 15/250.19; 15/250.202
(58) Field of Search ....................... 15/250.19, 250.202, 15/250.203, 250.351, 250.352, 250.21, 250.34, 250.16

(56) References Cited

U.S. PATENT DOCUMENTS 3,026,555 A  * 3/1962 Dudley .................... 15/250.19
3,224,026 A  * 12/1965 Trzebinski ............... 15/250.19
5,056,182 A  * 10/1991 Fukumoto et al. ..... 15/250.202
5,339,489 A    8/1994 Journee

FOREIGN PATENT DOCUMENTS

| | | | | |
|---|---|---|---|---|
| AU | 201838 | * | 4/1955 | ........... 15/250.202 |
| DE | 880864 | * | 6/1953 | ............. 15/250.19 |
| DE | 1 680 194 | | 9/1971 | |
| DE | 32 28 087 A1 | | 2/1984 | |
| DE | 37 44 237 A1 | | 7/1989 | |
| DE | 40 28 494 A1 | | 4/1991 | |
| DE | 42 02 965 C1 | | 1/1993 | |
| DE | 42 35 395 A | | 4/1994 | |
| EP | 487859 | * | 6/1992 | ........... 15/250.202 |
| FR | 2 750 662 A | | 1/1998 | |
| GB | 826115 | * | 12/1959 | ............. 15/250.19 |
| JP | 4-85150 | * | 3/1992 | ............. 15/250.19 |

* cited by examiner

Primary Examiner—Gary K. Graham
(74) Attorney, Agent, or Firm—Michael J. Striker

(57) ABSTRACT

The invention is based on a windshield wiper having a wiper arm (10), the mounting part (12) of which sits on a drive shaft (34) supported in a bearing housing (38), and which is connected by way of a hinged arm (46) with a joint part (14) having a wiper bar (16), whereby at least one tension spring (50), one end of which is attached to the mounting part (12) and the other end of which is attached to the joint part (14), preloads the hinged arm, and a setting device having a rocker arm (24) lifts the joint part (14) in a park position completely away from a vehicle windshield (22). The rocker arm (24) is supported in a swing bearing (46) on the mounting part (12), and a ramp (26) attached to the vehicle controls the cooperating end (28) of the rocker arm (24).

7 Claims, 2 Drawing Sheets

WINDSHIELD WIPER WITH BLADE LIFTING MECHANISM

BACKGROUND OF THE INVENTION

Known windshield wipers have a wiper arm comprising a mounting part and a joint part having a wiper bar hinge-mounted on this by way of a hinged arm. The mounting part sits on a drive shaft that is supported in a bearing housing and swivels the wiper arm basically parallel to a vehicle windshield. A wiper blade is hinge-mounted on an open end of the wiper bar. The wiper blade has a usually multisectional carrier strap system having secondary straps hinge-mounted on a middle strap, of which at least a few hold a wiper strip on its headpiece by way of claws on their ends. The multisectional carrier strap system and springs inserted in the headpiece make it possible for the wiper strip to adapt to a curved vehicle windshield with an even bearing pressure during wiping. A tension spring preloads the hinged arm for this purpose. Such windshield wipers are made known in DE 37 44 237 A1, for instance. In simplified embodiments, secondary straps-also called intermediate straps and claw straps-can be eliminated. In the simplest case, the middle strap itself has claws, with which it holds the wiper strip.

A wiper device for windshields of motor vehicles is made known in DE-AS 16 80 194, in which a wiper arm lies in a park position when swiveled in by way of a lifting device which is formed by a plunger acted upon by a spring and which lifts the wiper arm having the wiper blade away from the vehicle windshield when it extends. The plunger is retracted and the wiper blade is placed against the vehicle windshield once more in that a controllable solenoid is activated. If the plunger actuation fails, the plunger would remain in the extended position. In this position it lies in the range of motion of the wiper arm, however, which can result in damage to the windshield wiper.

A windshield wiper for motor vehicle windshields is made known in DE 42 02 965 C1, the wiper arm of which lifts in a park position by way of a lifting device and the wiper blade thereby lifts away from the vehicle windshield. The lifting device includes a lifting arm that is supported outside of the area traversed by the wiper arm and the wiper blade and that has a lifting height in its working position which-based on an area covered by the wiper arm-corresponds to a position of the lifting arm that overlaps the windshield wiper in its wiping position with free travel. This prevents a situation in which, if the lifting device is defective, the motion of the wiper arm collides with the lifting arm and the wiper device is damaged.

A wiper system for motor vehicle windshields is made known in DE 32 28 087 A1 in which the contact pressure of the wiper arm can be adjusted by the axial stroke of a plunger. The plunger acts on a double-armed lever that is situated along the wiper arm longitudinal direction. As a result, pressure on the wiper blade in the park position of the windshield wiper is released, and the wiper lip is protected from permanent-deformation.

Moreover, a windshield wiper for motor vehicles is made known in DE 40 28 494A1 in which the contact pressure of the wiper arm is reduced when the motion is reversed, in order to prevent noises. To this end, a rocker arm is supported on a joint bolt of the hinged arm that carries a hinging device for the tension spring on one end of a lever arm and includes a roller on the end of the other lever arm that runs on a ramp provided next to the bearing housing. The hinging device is displaced by way of the ramp and the rocker arm as a function of the rotary position of the wiper arm in such a manner that the contact pressure of the wiper arm in the reversing positions of the windshield wiper is reduced.

SUMMARY OF THE INVENTION

According to the invention, the rocker arm is supported in a swing bearing on the mounting part, and a ramp attached to the motor vehicle controls the cooperating end of the rocker arm. As a result, it is ensured by way of simple and reliable means that the wiper blade in the park position is lifted away from the vehicle windshield. Pressure on the wiper lip of the wiper blade is released completely when the windshield wiper is shut off, so it does not become permanently deformed over a long period of time, which would impair the wiping quality. Moreover, it prevents a situation in which the wiper lip freezes to the vehicle windshield when frost forms and is damaged when pulled loose.

The ramp itself is a simple component that is advantageously an integral component of the cleaning system and is preferably attached to the bearing housing of the windshield wiper.

The rocker arm can be supported in its own swing bearing on the mounting part. In a simple manner, however, it is advantageously supported on an arm axis of the hinged arm. In order to reduce the friction between the ramp and the rocker arm, a roller is provided on the end of the rocker arm that cooperates with the ramp.

Since the wiper arm does not necessarily have to be lifted away from the vehicle windshield every time when it reaches the park position, but rather only when the windshield wiper is turned off, the solution is especially advantageous for wiper systems having an extended park position that is entered into only when the windshield wiper is turned off. In this case, the ramp is adjusted to the wiper system in such a way that the rocker arm lifts the joint part having the wiper blade away from the vehicle windshield in the extended wiping angle range of the parking position.

The wiper blade is usually located in the park position in a so-called hood gap between the engine hood and a windshield of the motor vehicle. Since the width of the hood gap is different on different types of motor vehicles, it is appropriate that the lifting height of the wiper blade from the vehicle windshield is adjustable. This can take place, for example, in that the angle of the rocker arm, which includes its ends, is adjustable, e.g., by way of bending or adapters that are placed on the ends of the rocker arm.

BRIEF DESCRIPTION OF THE DRAWINGS

Further advantages arise from the following description of the drawing. A design example of the invention is presented in the drawing. The drawing, the description, and the claims contain numerous features in combination. It is appropriate for the expert to also examine the features individually and combine them into additional logical combinations.

DESCRIPTION OF THE PREFERRED EMBODIMENTS

Figure 1:
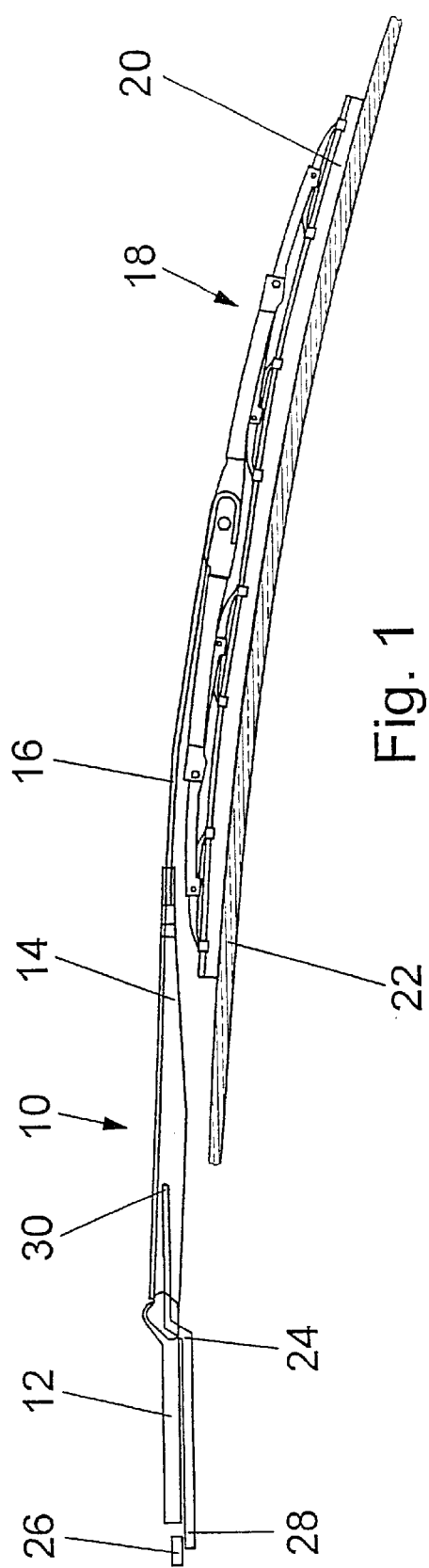
FIG. 1 shows a simplified view of a windshield wiper.
Figure 2:
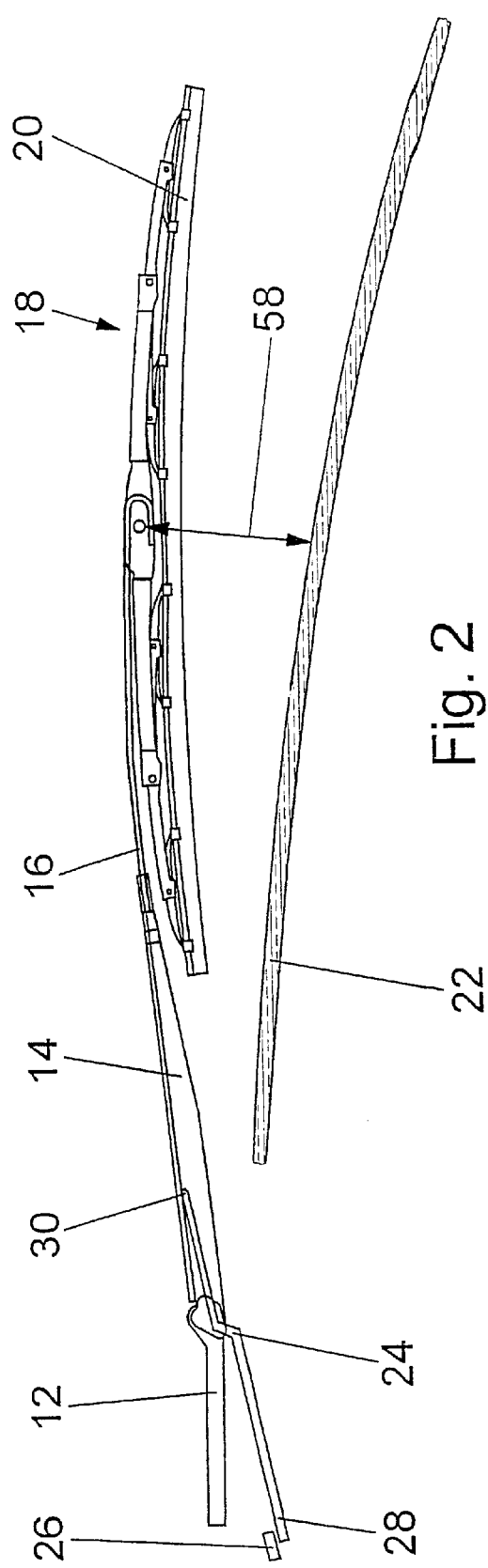
FIG. 2 shows a windshield wiper according to FIG. 1 in a position lifted away from a vehicle windshield.
Figure 3:
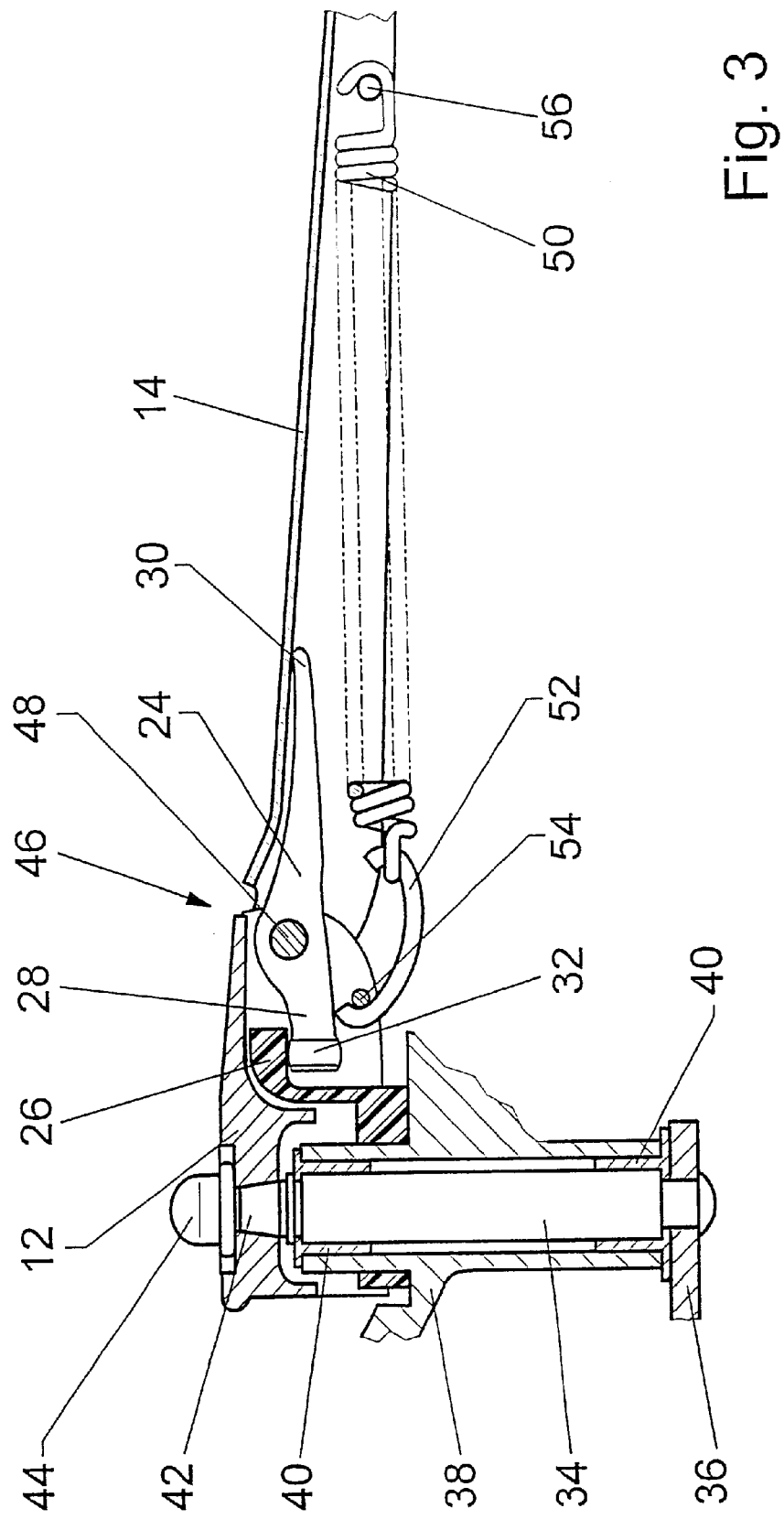
FIG. 3 shows a partial longitudinal sectional view through a windshield wiper in the area of a wiper bearing.

The windshield wiper according to the invention has a wiper arm 10 that comprises a mounting part 12 and a joint part 14 having a wiper bar 16 hinge-mounted on it by way of a hinged arm. A wiper blade 18 is hinge-mounted on the wiper bar 16, the wiper strip 20 of which is pressed against the vehicle windshield 22 with a contact pressure to clean a vehicle windshield 22.

The contact pressure is created by a tension spring 50, one end of which is attached to a hinging device 56 of the joint part 14, and the other end of which is attached to a hinging device 54 of the mounting part 12 by way of a C-bracket 52, thereby preloading the hinged arm 46.

A drive shaft 34 that is supported in a bearing housing 38 by means of bearing sleeves 40 on its ends is driven by a rotating link 36 on one end and, on its other end, itself drives the mounting part 12 that is held on a clamping cone 42 by means of a screw 44.

A rocker arm 24 is supported on an arm axis 48 of the hinged arm 46, one end of which 30 lies against the interior side of the joint part 14, and the other end 28 of which carries a roller 32 that runs on a ramp 26. The ramp 26, which is advantageously made out of a plastic, is permanently connected with the bearing housing 38. It can also be an integral component of the bearing housing 38, whereby the multiplicity of parts is reduced.

The ramp 26 controls the motion of the rocker arm 24 in the manner that it lifts the joint part 14 by means of its end 30 in the park position of the wiper arm 10. The lifting height 58 away from the vehicle windshield 22 is thereby selected in such a manner that, on the one hand, the wiper blade 18 has sufficient clearance from the vehicle windshield 22, but, on the other hand, a collision with adjacent motor vehicle parts, e.g., a non-further-described engine hood, is avoided. In wiper systems having an extended park position that is reached only when the windshield wiper is turned off, the ramp 26 is designed in such a manner that the rocker arm 24 only lifts the wiper blade 18 in the extended park position.

REFERENCE NUMBERS

10 Wiper arm
12 Mounting part
14 Joint part
16 Wiper bar
18 Wiper blade
20 Wiper strip
22 Vehicle windshield
24 Rocker arm
26 Ramp
28 End
30 End
32 Roller
34 Drive shaft
36 Rotating link
38 Bearing housing
40 Bearing sleeve
42 Clamping cone
44 Screw
46 Hinged arm
48 Arm axis
50 Tension spring
52 C-bracket
54 Hinging device
56 Hinging device
58 Lifting height

What is claimed is:

1. A windshield wiper of a cleaning system for a vehicle, said wiper having a wiper arm (10) supporting a wiper blade (18), a mounting part (12) of the wiper arm sits on a drive shaft (34) which is supported in a bearing housing (38) said mounting part is connected by way of a hinge arm (46) with a joint part (14) having a wiper bar (16), whereby at least one tension spring (50), one end of which is attached to the mounting part (12) and the other end of which is attached to the joint part (14), preloads the joint part, and a setting device having an elongated rocker arm (24) lifts the joint part (14) to lift the wiper blade (18) in a park position completely away from a vehicle windshield (22), characterized in that the rocker arm (24) is supported in a swing bearing (46) on the mounting part (12), and a ramp (26) attached to the vehicle controls a cooperating end (28) of the rocker arm (24).

2. Windshield wiper according to claim 1, characterized in that an arm axis (48) of the hinge arm (46) serves to fasten the rocker arm (24).

3. Windshield wiper according to claim 1, characterized in that the ramp (26) is a component of the cleaning system.

4. Windshield wiper according to claim 3, characterized in that the ramp (26) is attached to the bearing housing (38).

5. Windshield wiper according to claim 1, characterized in that the course of the ramp (26) on a wiping system having an extended park position is shaped so that the rocker arm (24) lifts the joint part (14) having the wiper blade (18) away from the vehicle windshield (22) in an extended wiping angle range of the extended park position, which is reached only when the windshield wiper is turned off.

6. Windshield wiper according to claim 1, characterized in that a lifting height (58) of the wiper blade (18) away from the vehicle windshield can be adjusted.

7. Windshield wiper according to claim 6, characterized in that the lifting height (58) of the wiper blade (18) can be adjusted by way of an angle of the rocker arm (24) that includes the ends (28, 30) thereof.

* * * * *